United States Patent [19]
Pankonen et al.

[11] Patent Number: 4,893,325
[45] Date of Patent: Jan. 9, 1990

[54] INTEGRATED PUBLIC SAFETY ANSWERING POINT SYSTEM

[75] Inventors: Andrew W. Pankonen, Naperville; Donald J. Jester, Lisle; Robert J. Mulrow, Wheaton; Catherine P. Modica, West Chicago; John M. Zdenek, Riverside, all of Ill.

[73] Assignee: Rockwell International Corporation, El Segundo, Calif.

[21] Appl. No.: 248,855

[22] Filed: Sep. 23, 1988

[51] Int. Cl.4 .............................................. H04M 3/54
[52] U.S. Cl. ..................................... 379/45; 379/142; 379/210; 379/265
[58] Field of Search ................... 379/45, 49, 265, 269, 379/308, 309, 142, 207, 210, 211, 201

[56] References Cited

U.S. PATENT DOCUMENTS 3,881,060  4/1975  Connell et al. .................. 379/45 X
4,310,726  1/1982  Asmuth ............................ 379/207
4,555,594 11/1985  Friedes et al. ................... 379/220

OTHER PUBLICATIONS

E. G. DeNigris, "Enhanced 911: Emergency Calling with a Plus", Bell Laboratories Record, Mar. 1980, pp. 74-79.
"Dial 911 for Profits", Paul Ruggieri, Sand Communications, May 1984, pp. 9-13.
E. S. Delong, Jr., "Making 911 Even Better", Telephony, Dec. 14, 1987, pp. 60-63.

Primary Examiner—James L. Dwyer
Attorney, Agent, or Firm—C. B. Patti; V. L. Sewell; H. F. Hamann

[57] ABSTRACT

A telephone call distribution system for handling a special type call, the call containing at least automatic number identification (ANI) data, having at least one central switching location for receiving the call and having a circuit for processing, an interfacing circuit with an automatic location identification (ALI) data base having ALI data associated with the ANI data, the circuit for interfacing receiving the ANI data from the processing circuit and returning the ALI data to the processing circuit, and having a storage provision for the ALI data associated with the call; and a connecting circuit for connecting the processing circuit to at least one remotely located terminal for receiving the call, the processing circuit also sending the ALI data to the terminal.

8 Claims, 8 Drawing Sheets

INTEGRATED PUBLIC SAFETY ANSWERING POINT SYSTEM

BACKGROUND OF THE INVENTION

The present invention relates in general to telephone call distribution systems and, in particular, to distribution systems for handling 911 type calls.

Traditional 911 call distribution arrangements servicing complex metropolitan areas utilize a centralized switch to route 9-1-1 calls to the correct PSAP (Public Safety Answering Point). Additional equipment is required at the PSAP to distribute calls to answering positions. On-premise equipment is an undue cost and maintenance burden, particularly for PSAPs with few answering positions. The present invention provides a solution to this drawback in the prior art with a switch that centralizes call distribution to individual answering positions as it routes the call to the correct PSAP.

Enhanced 911(E911), consists of three major features selective routing, Automatic Number Identification (ANI), and Automatic Location Identification (ALI). Selective routing, implemented through a control office, is the ability to route a call to the correct answering point, that is the one which serves the calling party's area. It is provided by using the calling party's telephone number forwarded to the control office by that party's end office using ANI forwarding trunks and protocols. The control office translates the number into a correct route choice. In E911 the term ANI describes the ability to display the calling party's telephone number at answering point positions by forwarding the number to the PSAP over ANI trunks, typically TSPS-type, and decoding it for display. The ANI is in turn used as a key to a record in an ALI data base. That record contains extended calling party information, including address, class of service, and serving emergency agencies. ANI and ALI are life-saving features when the calling party cannot provide location information for some reason. Enhanced 911 with selective routing is a necessity in metropolitan areas where a central city is ringed by a number of smaller communities which abut one another, but where each community wants to continue receiving and dispatching its own emergency calls.

In addition to these features, some large cities have benefited from a fourth set of features by implementing an on-premises automatic call distribution (ACD). very useful ACD features include queuing calls for order of arrival service, equitable distribution between attendants, and detailed traffic reports.

Previously, there has not been a cost-effective way of providing advanced call-handling features to small communities with, for example, four to ten emergency answering and overflow positions. The customer equipment to deliver those features is quite expensive at low position count. Four aspects which are lacking in prior art systems are cost effectiveness for small answering points, a full set of user points, a full set of user features including ACD capabilities, ease of use, and compatibility with current system elements.

The cost-effectiveness goal must address the small size of many agencies and their commensurate small budgets for equipment and ongoing expenses. It must also address the distance that small or large answering points might be from a control office. In response to the small size problem, a centralized system is needed where the application control is shared by many agencies. The distance issue implies that a pair of circuits, one data, one voice, for each position could offset centralized application control economics and thus needs to be avoided. This leads to a requirement for a single circuit supporting both voice and data requirements.

ACD features are important tools to agencies who have them. Traffic and call handling summary reports are especially useful for scheduling and, to a growing extent, crime analysis. Beyond centralization of fundamental E911 features, an application need is to provide queuing, call distribution and control, reports, and supervisory features in the package.

All communities handle emergency calls in some way today. Basic and enhanced 9-1-1 systems have been deployed. A new system must be compatible with as much of the existing system as possible. The obvious compatibility issues are with signaling protocols and interfaces to existing central office and customer-premises hardware. Another compatibility issue is with the current call handling procedures. In many cases, it is desirable to retain aspects of the previous system, for example, in the handling of administrative and alarm service calls. To maximize compatibility requires that the displacing system be very flexible.

The present invention fulfills these requirements and provides a system which overcomes the drawbacks in prior art systems.

SUMMARY OF THE INVENTION

The present invention has the following features and advantages

It is cost effective for small and large PSAP sizes. There is no PSAP controller which must be amortized over a few positions.

It permits flexibility in designing a system. One set of position equipment can be mixed and matched to meet user's specific needs. Features can also be tailored for each PSAP.

It reduces customer-premise equipment requirements. Premise controllers, with numbers of circuit interfaces, are eliminated.

It co-resides on a SCX Service Node allowing the SCX resource to be shared among multiple applications.

It supplies a full range of emergency service features including all 911 features.

It provides digital ACD capabilities for improved call processing and allows queuing of calls at the SCX. Each PSAP has the choice of manual or auto answer options.

It provides optional supervision positions with call monitor capabilities.

It furnishes management information reports on attendant and network performance.

The integrated PSAP System (IPSAP) of the present invention operates on a SCX in conjunction with Selective Routing System software. An overview on the operation of the Integrated PSAP System is as follows.

End Office to SCX Host Link—An end office, homed on the SCX with Selective Routing Feature Package Software, recognizes a 9-1-1 call, and forwards it to the SCX, together with the calling-party ANI.

Routing Tables—Regardless of the type of PSAP the same routing tables are used to do selective routing and transfer between PSAP entities. These tables are implemented as part of the existing Selective Routing package. They are initialized and maintained through interfaces to an ALI data base system, interfaces to other data preparation subsystems as required or by direct input and recent change via SCX console commands.

SCX to PSAP Link—compatible PSAP circuits are provided for the type of PSAP system. If the PSAP is an Integrated type, each position is provisioned with an individual dedicated communication link. These circuits are not switched at the PSAP end. All call distribution, switching, and transfer is accomplished at the SCX. Moves and rearrangements are accomplished via software table changes.

PSAP Control—The IPS Control Module performs the same function as the logic in an intelligent PSAP Controller, with the addition of automatic call distribution functions. The Control Module also monitors agent consoles for call-handling commands, identifies appropriate ANI or ALI display positions, sends information to them and interacts with supervisor's terminals to provide supervisory and administrative features.

ALI Interface—The ALI Interface module connects the Control Module with an ALI data base system. Upon receipt of a call distribution request, the Control Module sends calling party ANI to the ALI Interface for further processing. The ALI Interface transacts with an ALI data base and retrieves ALI data. When ALI data is returned the Control Module associates the data with a terminal through the ANI embedded in the ALI record. The Control Module formats the data for screen presentation and forwards it to the interface channel for the appropriate PSAP position.

ALI data is stored in the SCX during the entire call session. ALI data sent to subsequent screens do not require a separate transaction to the ALI data base, thereby conserving data base throughout, except when a request for a new transaction is made by a PSAP attendant. The ALI interface also passes data to the Control Module for use in an optional computer-aided dispatch (CAD) interface.

CAD Interface—An optional CAD Interface Module can be provided for those PSAPs having their own Computer Aided Dispatch (CAD) system. The module consists of SCX Host-resident software and one or more dedicated data circuits from the SCX Host to the CAD system. ALI data is transmitted to the CAD system along with position number when an attendant takes the call. Data transfer is expected to be serial ASCII, to one or more RS232-C ports.

PSAP Premises Equipment—To meet the diverse needs of municipalities and agencies a set of PSAP premises equipment is provided. Individual components are combined at each attendant or supervisor position to provide desired functionality.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

The present invention has general applicability, but is most advantageously utilized in an Integrated PSAP system (Public Safety Answering Point). System features are provided directly from a SCX host processor. The Integrated PSAP System permits the SCX to fully control relatively simple voice and data terminals at PSAP locations, to interact with a data base which provides Automatic Location Identification (ALI), and to provide automatic call distribution and management information report services at multiple answering points.

The Integrated PSAP System is a cost effective method of providing E911 to a wide range of community sizes and public agency types. Expensive intelligent controllers at each PSAP site are not required. However, the SCX can simultaneously support a wide variety of conventional PSAP types. This flexibility allows a municipality that presently has a form of 911 to gradually migrate to a new system while maintaining its present equipment. Through centralization of major system components, such as trouble diagnostics and maintenance, costs can be reduced. The use of the Integrated PSAP System eliminates the need for ACD and ALI multiplex equipment at the answering point. The PSAP control approach of the present invention gives emergency system designers great flexibility and provides full E911 features to the smallest primary and secondary PSAPs, as well as the largest, using the same set of hardware and software features.

Figure 1:
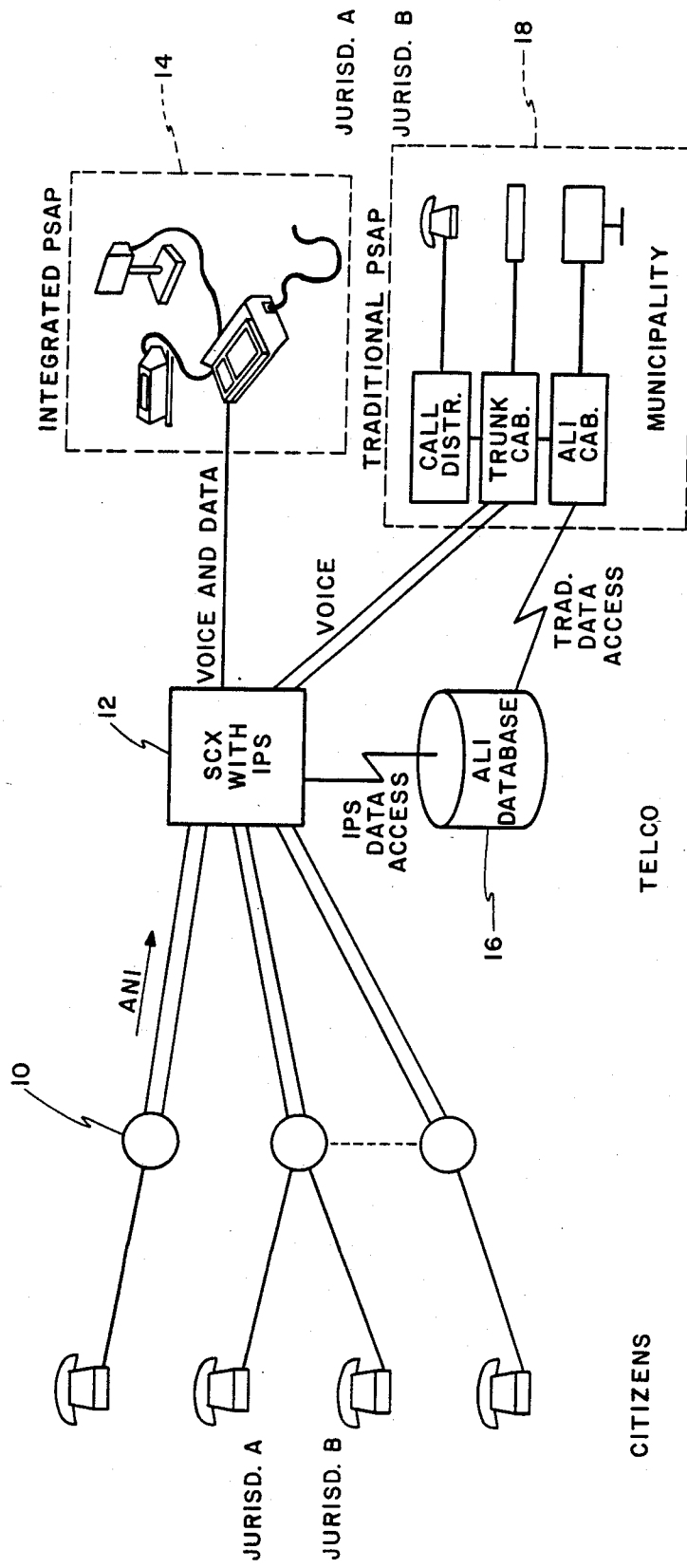
FIG. 1 is a general illustration of the integrated PSAP system of the present invention.

The major components of the Integrated PSAP System are described below and are shown in FIG. 1. The End Offices 10 are homed on the SCX 12 which, with its Selective Routing Feature Package software, required as a base, recognizes a 911 call, identifies and routes the call to the appropriate PSAP such as PSAP 14.

Flexibility in the routing translation tables in the SCX 12 allows the system to function regardless of the type of PSAP. These tables are resident as part of the standard Selective Routing Package. They are initialized and maintained through interfaces to an ALI 16 data base, either on a dedicated link or dial-up modem or they can be inputted directly into the SCX 12 from a local or remote administrative terminal (not shown).

The type of line required is specified at the engineering stage. If the PSAP is of a conventional type, such as PSAP 18, compatible circuits are two-wire reverse battery signaling, with the final link being loop start. If the PSAP is an integrated type, such as PSAP 14, each position is provisioned with an individual dedicated two-wire voice link between the SCX 12 and each Console in the PSAP 14. These dedicated voice links may be any facility capable of passing full voice band spectrum (200–4000 Hz) plus hook-switch supervision. All communication voice, ALI data, and control signaling are done in the voice band. Echo suppressors should not be used on the circuit as it interferes with ALI data transmission. The ALI data transmission technique employs a V2.07 synchronous protocol using DPSK techniques, with the fast modem synchronization option With the Integrated PSAP, all call distribution, switching and transfer is accomplished at the SCX 12. The Integrated PSAP System software logically groups PSAP consoles into clusters associated with a single PSAP, either primary or secondary.

Figure 2:
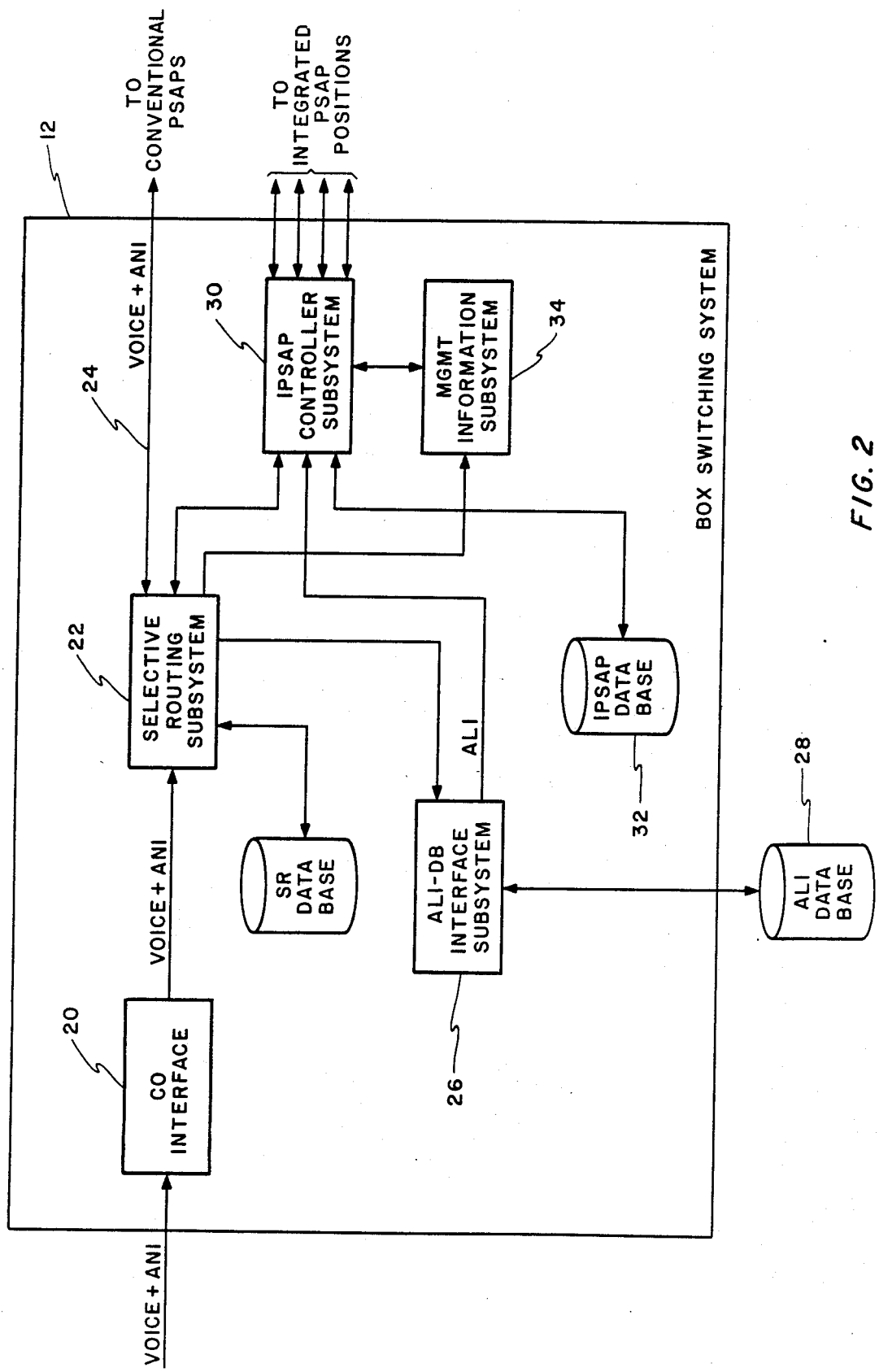
FIG. 2 is a block diagram of the portion of the system located in an SCX.

Referring now to FIG. 2, a Control Module 30 in the SCX 12 has software which performs much the same function as the logic in an intelligent PSAP controller. Calls to the particular PSAP group or queue are handled on a strictly first in, first out basis (FIFO). Within the group calls may be optionally distributed as manual or automatic answer.

The Control Module 30 monitors consoles for call handling commands, sends ALI information to them, and interacts with supervisory terminals to provide administrative features.

Upon receipt of ANI from an End Office 10 the Control Module 30 interacts with the ALI Interface Module 26. The Control Module 30 sends calling party ANI to the ALI Module 26 for further processing. The ALI Module 26 queries the ALI data base 28 and retrieves ALI data. When ALI data is returned, the Control Module 30 associates the data with a particular position through the ANI embedded in the ALI record. The Control Module 30 formats the data for screen presentation and passes it through the appropriate voice channel to the PSAP position. ALI data sent to subsequent screens does not require a separate transaction to the ALI data base. It is buffered in the SCX ALI Interface Module 26. Should a PSAP attendant need to verify ANI or ALI data, a second request may be generated from the SCX 12 without interruption to the call in progress. The ALI interface 26 can also pass the ALI data to a customer premises Computer Aided Dispatch System (CAD).

The Integrated PSAP (IPSAP) feature package consists of the IPSAP Controller 30 (along with the IPSAP data base 32), the ALI-DB Interface 26, and the Management Information Subsystems 34. The heart of the IPSAP package is the IPSAP Controller 30 because it this subsystem that makes centralization of IPSAP control possible.

The IPSAP Controller Subsystem 30 controls the PSAP-resident terminal equipment and provides ACD type features such as call queuing, single key selection of functions to initiate call transfer or call trace, request assistance, print call data, put a call on hold, or to request the ALI information with either the received ANI or another telephone number.

The Management Information Subsystem 34 (MIS) generates and maintains statistics on each trunk, IPSAP, and individual position. Statistics are output on the IPSAP printer. MIS functions include IPSAP Statistics Reports, Agent Statistic Reports, Trunk Group Reports, and ALI Information for calls.

The ALI-DB subsystem 26 makes it possible for the SCX 12 to communicate with a remote Automatic Location Identification (ALI) data base 28 and display the information gathered at the IPSAP.

The Selective Routing Feature can be used with E911 systems that employ on-site equipment for the distribution of emergency calls, in conjunction with the SCX IPSAP Feature which centralizes the call distribution functions, or a combination of the two.

In contrast to E911 systems that employ controls at the individual Public Safety Answering Points (PSAPs), the SCX's IPSAP centralizes PSAP control at the SCX. This arrangement is more cost effective in terms of equipment required and is more efficient to operate.

When "911" is dialed, the call goes to the Central Office (CO). The CO passes the call, along with the ANI, to a CO interface 20 in the SCX 12. At the SCX 12, Selective Routing 22 examines the call to determine if it is a conventional PSAP or IPSAP call. If it is a conventional PSAP call, Selective Routing routes the call to the appropriate answering point on line 24. For Integrated PSAP calls, the SCX 12 (via the appropriate ALI-DB Interface 26) accesses a remote ALI data base 28 which provides details on the caller's location. The SCX 12 then routes the call, along with ANI and ALI, to the appropriate IPSAP position through IPSAP controller 30.

The Selective Routing System 22 (SRS) is an SCX feature package that routes 911 calls to the appropriate Public Safety Answering Point (PSAP) based on calling station identification (ANI). Basically, the Selectively Routing Feature provides routing, PSAP selection, and call transfer capability. This feature is especially useful in E911 installations.

The PSCS system must process both voice and data. Additionally, it must be capable of communicating with remote agent and supervisor consoles, administrative and maintenance terminals, printers, CADs, and different types of ALI data bases. The SCX Switching System 12 is lie a host computer in that it has control of all the processors distributed throughout various systems.

For PSAP locations having their own computer aided dispatch system, a CAD interface can be established. The interface consists of SCX host-resident software and one or more dedicated data circuits from the SCX to the PSAP. ALI data is transmitted to the CAD system, along with the position number, as the attendant answers the call. Data transfer is in serial ASCII format and requires an RS232-C port to the CAD system. Data flow control uses an ACK/NAC protocol with start and stop supervision, operating at 1200-4800 bits per second.

Figure 3:
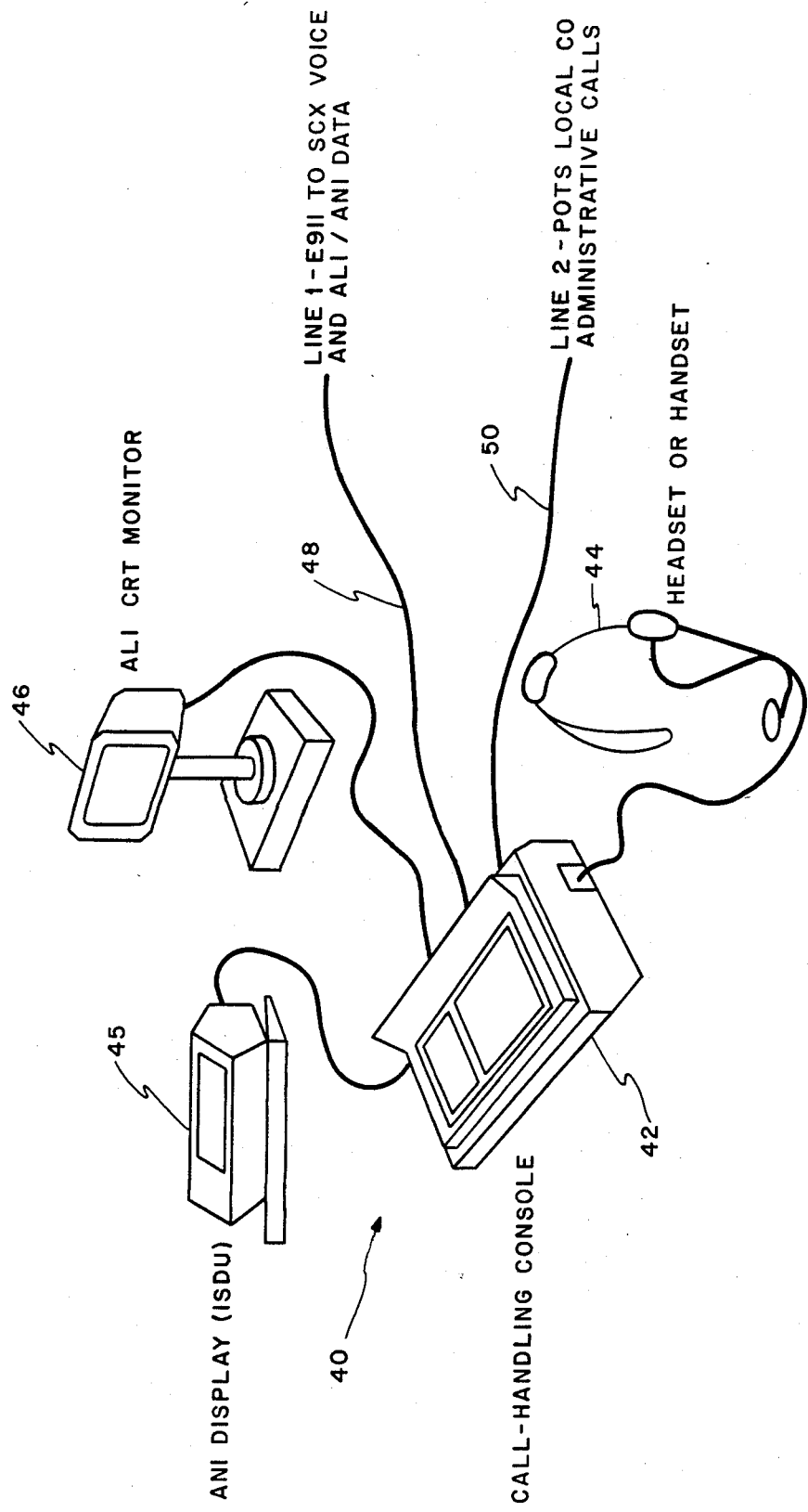
FIG. 3 is an illustration of the PSAP hardware at an attendant location.
Figure 4:
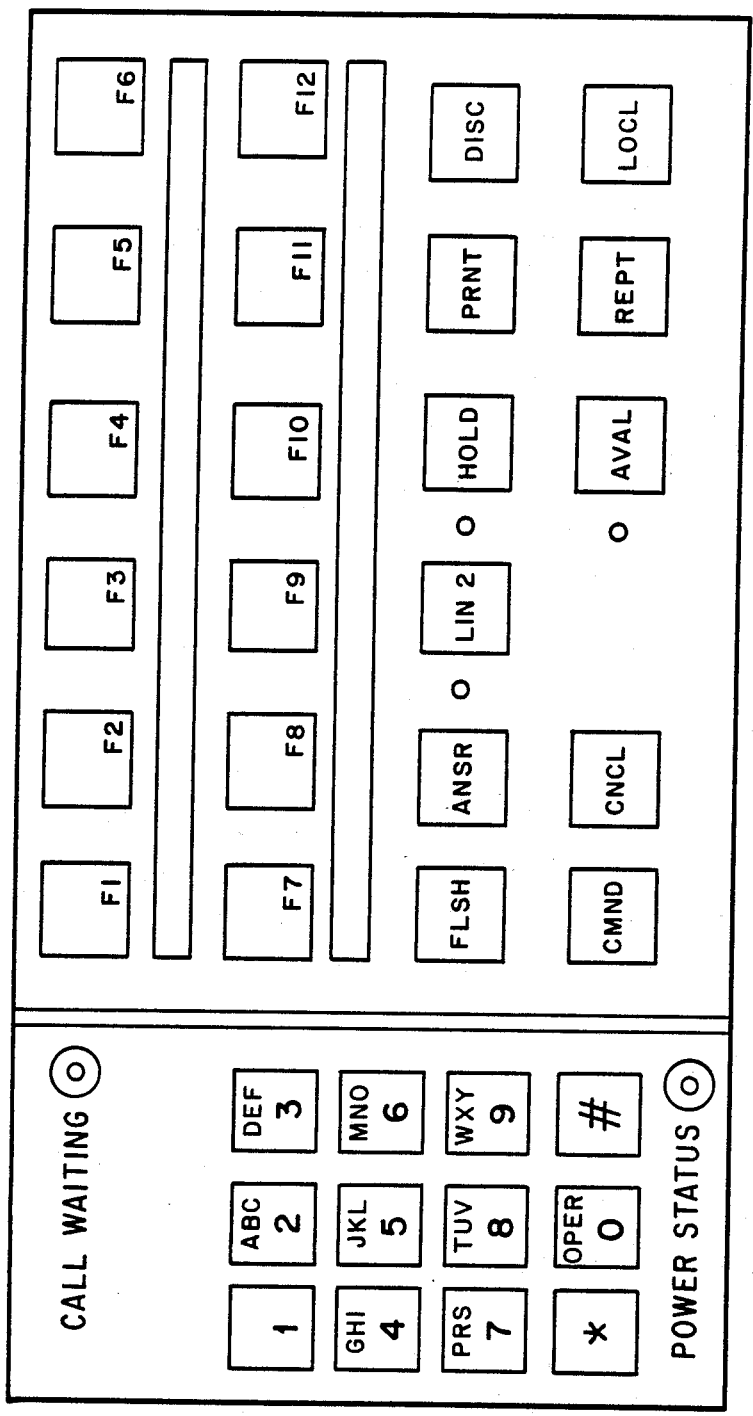
FIG. 4 is a diagram of the keyboard layout for an attendant location.

Individual PSAP units 40 are combined at each attendant or supervisory position to provide the desired functionality. Each unit is briefly described below in reference to FIGS. 3 and 4.

A console 42 is the fundamental voice and data interface unit. It may be equipped with a handset or a headset 44. In a preferred embodiment, the Console 42 faceplate is of membrane technology and is grouped to three keypad fields: a 12-button dialing pad; a dedicated field of 11 function keys; and a customizable field with 12 function keys. The dialing pad and dedicated keys can have preprinted captions. The variable keys have PSAP-unique label strips under each row which are printed with the function of the variable key. Variable keys may be used for fixed and/or selective call transfers for speed call transfers and for single-bottom access to any of the console command set. SCX resident tables translate DTMF tones sent from the console 42 into unique PSAP specific commands. A recorder interface is built in to provide for connection to customer-provided playback-tape recording equipment. An integral V.27 4800 bps modem receives ANI and ALI data from the SCX 12. Data is received at the console 42 before the calling party and attendant are connected. The data is stored in the console 42 and transmitted to an ANI display 45 and an ALI display 46 via RS422/RS232 interfaces located on the rear of the unit. Dedicated function key commands are also transmitted to the SCX 12 as a series of DTMF tones. Similar tone sequences are used to control console lamp and status. The control provides two incoming lines, 48,50 selectable through a toggled key. The second line 50 provides for administrative calls and may be used for local service access. The primary line 48 is reserved for E911 calls. Console options are selected by PSAP and provide for such features as key click, audible ringing tone, and console tests. A brief description of the dedicated console key functions will outline the call handling features (see FIG. 4)

(1) ANSR Key—In a manual answer mode, the answer key is used to pick up a call at the position (taking the phone off-hook). It is also used to take a line 2 call.

(2) DISC Key—The DISC key puts the console on hook for line 1 and line 2. When used on line 1 call it restores the position to the available state; and drops the calling party. If disconnect is done from a conference state, other parties will remain connected; if done from a single party state, the caller is force disconnected and the position returns to the available state.

(3) FLSH Key—Seven or ten digit dialing is accomplished using the flash key and the dialing keypad. To dial from the keypad, the flash key is operated, dial tone is returned from the SCX, and the called party number is entered. Attendants may access the public dialed network through this means. The flash key causes a timed switchhook flash to be generated to the SCX causing a register to be attached for digit reception.

(4) CMND Key—The command key is used to invoke a number of features that occur less frequently. Operation causes a code to be sent to the SCX alerting it that a subsequent two-digit command sequence dialed from a dialing pad will follow. Commands defined in the IPSAP release 1 are as follows:
 Request for Supervisor Aid;
 Initiate a Call Trace;
 Blank Displays;
 Reset the Console to a Predetermined State;
 SCX-Console Channel Tests; and
 Console Self Tests.
Use of the Command Key will not release a call if call is in progress. Both parties remain on the line, and the command tones can be heard. If channel test is inadvertently operated, calls in progress will not be lost. Channel test which initiates a series of SCX to console codes is disregarded when a call is in progress.

(5) CNCL Key—The cancel function via the CNCL key deletes a command or dialing sequence in progress. For example, if a wrong digit is dialed the cancel key lets you begin again. It is also used to drop an added third party and to escape from Local (setup) mode.

(6) LIN2 Key—This key provides access to a second line at the console. The second line provides basic telephone features only and cannot be used for 911 calls. The ALI data modem cannot be attached to the second line, nor can calls be transferred locally between lines. The LIN2 key functions an A/B switch toggling the console's voice circuitry between the 911 line and line 2. When connected to line 2, the key lamp is lit. When connected to a local key system, all current incoming line appearances are preserved and accessible without accessing or backhauling to the SCX.

(7) HOLD Key—The hold key places a line 1 call on muted hold. The attendant can take another call while the original party is on hold or a call can be taken or placed using line 2. This feature can be denied on a per-PSAP basis via our SCX maintenance command. The hold lamp is activated when a caller is on hold. Only one party can be held at a time.

(8) AVAL Key—When operated, the AVAL key is used to place the console in the ready to accept line 1 calls state. The lamp is on when the position is on line and an attendant is available. Toggling the key makes the position unavailable. The available lamp flashes when line 1 is in use.

(9) PRNT Key—Keying the PRNT key causes the current ALI screen to be directed to a predetermined PSAP printer. Other console functions are not affected by printing.

(10) REPT Key—The first invocation of the REPT key within a calling session causes the SCX to retransmit buffered ALI data to the ALI screen. A second keying causes the SCX to request a new ALI record from the ALI data base and overlays the old record, passing it to the ALI screen. Calls in progress to the position are not affected.

(11) LOCL Key—This key places the console in local mode for setup. In this mode, the custom keys are used to set parameters. Local mode cannot be entered when the console is available. Local mode functions in the IPS Release No. 1 include the following:
 Audible Ring On/Off;
 Audible "Key Chirp" On/Off;
 ALI Display Port On/Off;
 ANI Display (ISDU) Port On/Off;
 Voice Level; and
 Data Level.
The ANI Display Unit 45 is an Individual Station Display Unit (ISDU) and is used when only ANI information is desired. In the preferred embodiment, the unit is a two-row by 40-character LCD display. The full ASCII character set is supported. Data is provided from the console 42 via RS422 interface, and the unit 45 is powered from the console 42. ANI is displayed on a top line. Other system messages are displayed on a lower line.

Also in the preferred embodiment, the ALI display 46 is a read-only monochrome CRT and has an RS232-C port which connects directly to the console 42.

Figure 5:
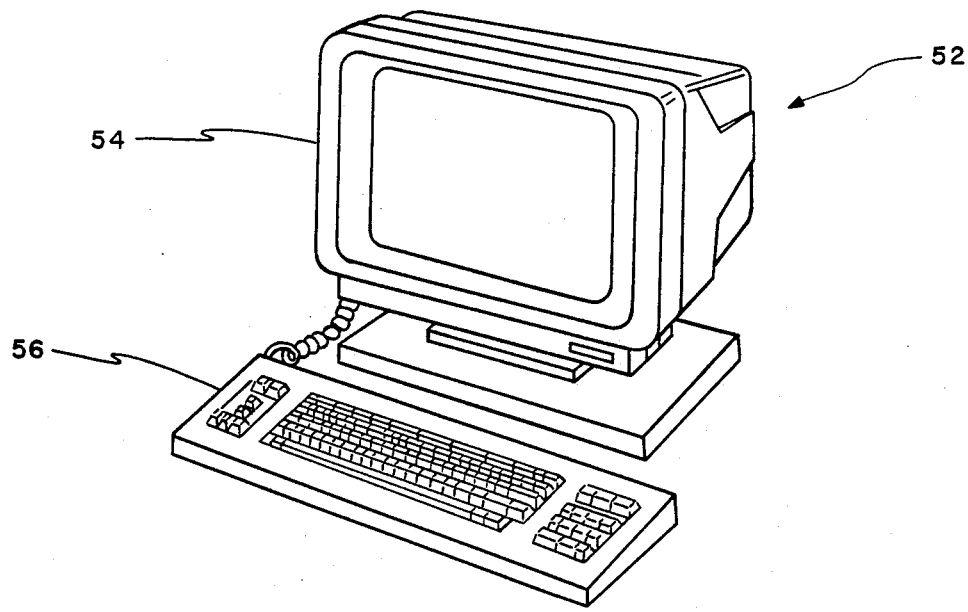
FIG. 5 is a perspective view of a supervisor protection equipment.

Supervisory and administrative features of the Integrated PSAP System are accessed through a series of menu screens on a supervisor's terminal 52 as shown in FIG. 5. The supervisory terminal 52 is a CRT 54 and keyboard 56 and provides the interface to the administrative features of the Integrated PSAP System. A dedicated low speed data line connects the terminal 52 to the SCX 12 to provide the supervisory analog and/or administrative features described below.

1. Assigning Passwords: This feature permits the supervisor to associate a specific attendant with the unique five-digit password so that data is collected on each attendant. This feature is controlled by the PSAP permission table to allow password assignment only to those attendants assigned to the logged-on supervisor.

2. View Status: This feature permits the supervisor to obtain a single screen status report from the Management Information System, including position status and current call waiting and queue length. Information is updated at one minute intervals.

3. Service Observing: This feature permits the supervisor to listen in (monitor) or break into the line of an assigned position in response to an aid request, or as a performance aid.

4. Function Keys: The supervisor's terminal function keys permit selecting features.

5. PSA Printers: When PSAP printers are required, they are provided through a separate dedicated low-speed analog data link to the SCX host. Printers can be used to provide call log records, ALI records, and management information equipment described above may be combined to meet a variety of agency needs. Three such configurations of agent and supervisor equipment are: ANI only, without supervisory features; ANI only, with supervisory features; and ALI with supervisory features.

Figure 6:
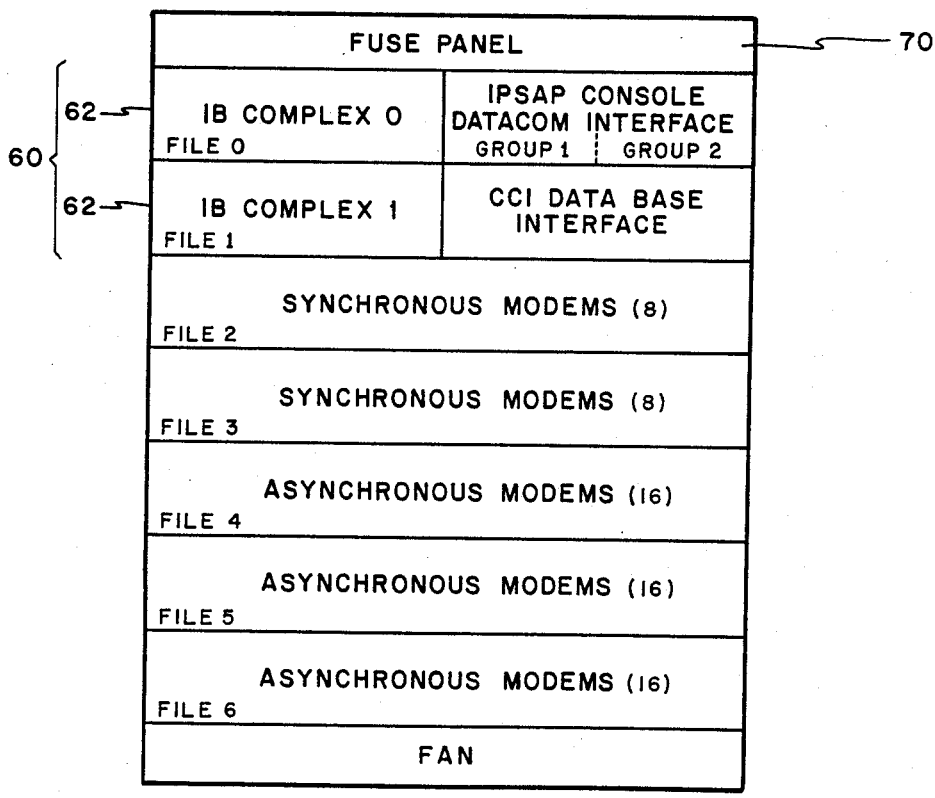
FIG. 6 is a schematic illustration of an interface frame layout in the SCX.
Figure 8:
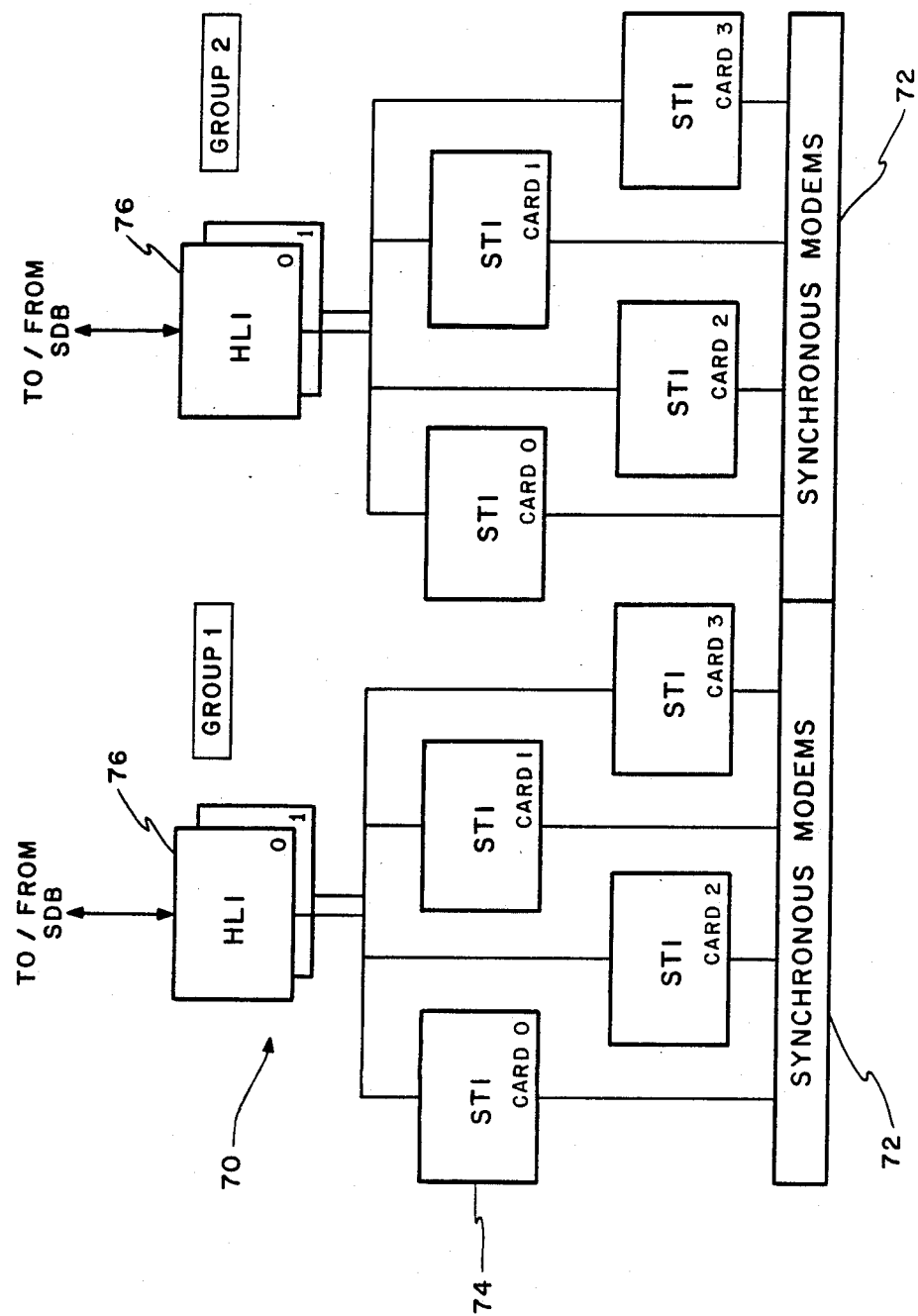
Figure 9:
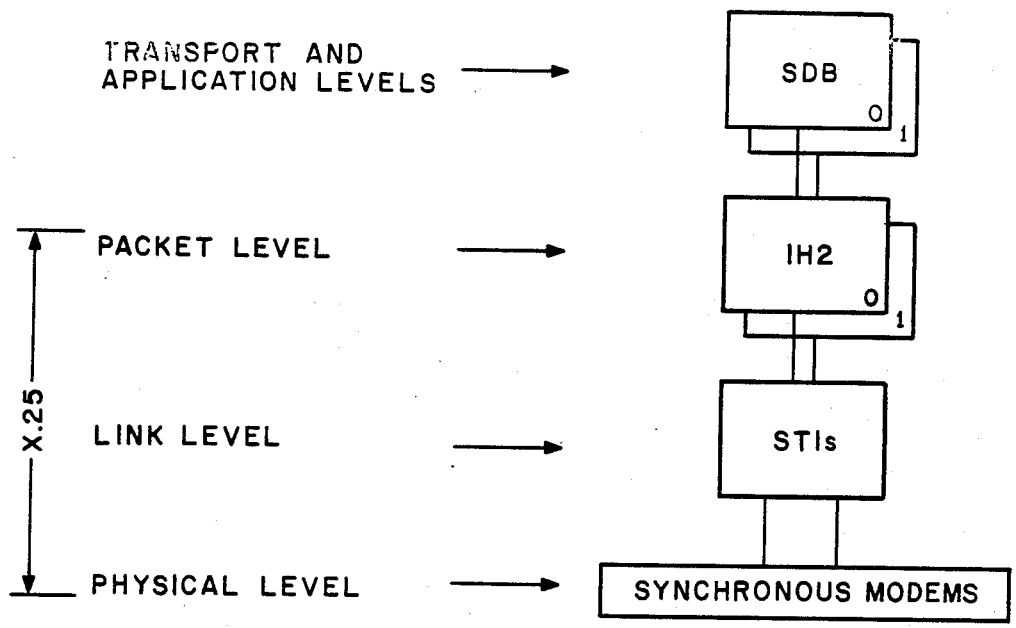

In addition to the conventional SCX equipment frames, a PSCS site will utilize an Interface frame. FIG. 6 provides an overview of the frame's organization. The Interface frame houses all the PSCS's data communications interface hardware. Up to 16 synchronous (files 2 and 3) and 48 asynchronous (files 4, 5, and 6) modems can be mounted in a frame. The system will support two Interface Frames. The three main types of intelligent interfaces used to couple the SCX's State Data Base (SDB) processor to the communications links are physically located in files 0 and 1. The associated hardware hierarchy diagrams for the interfaces are depicted in FIGS. 7, 8 and 9.

Figure 7:
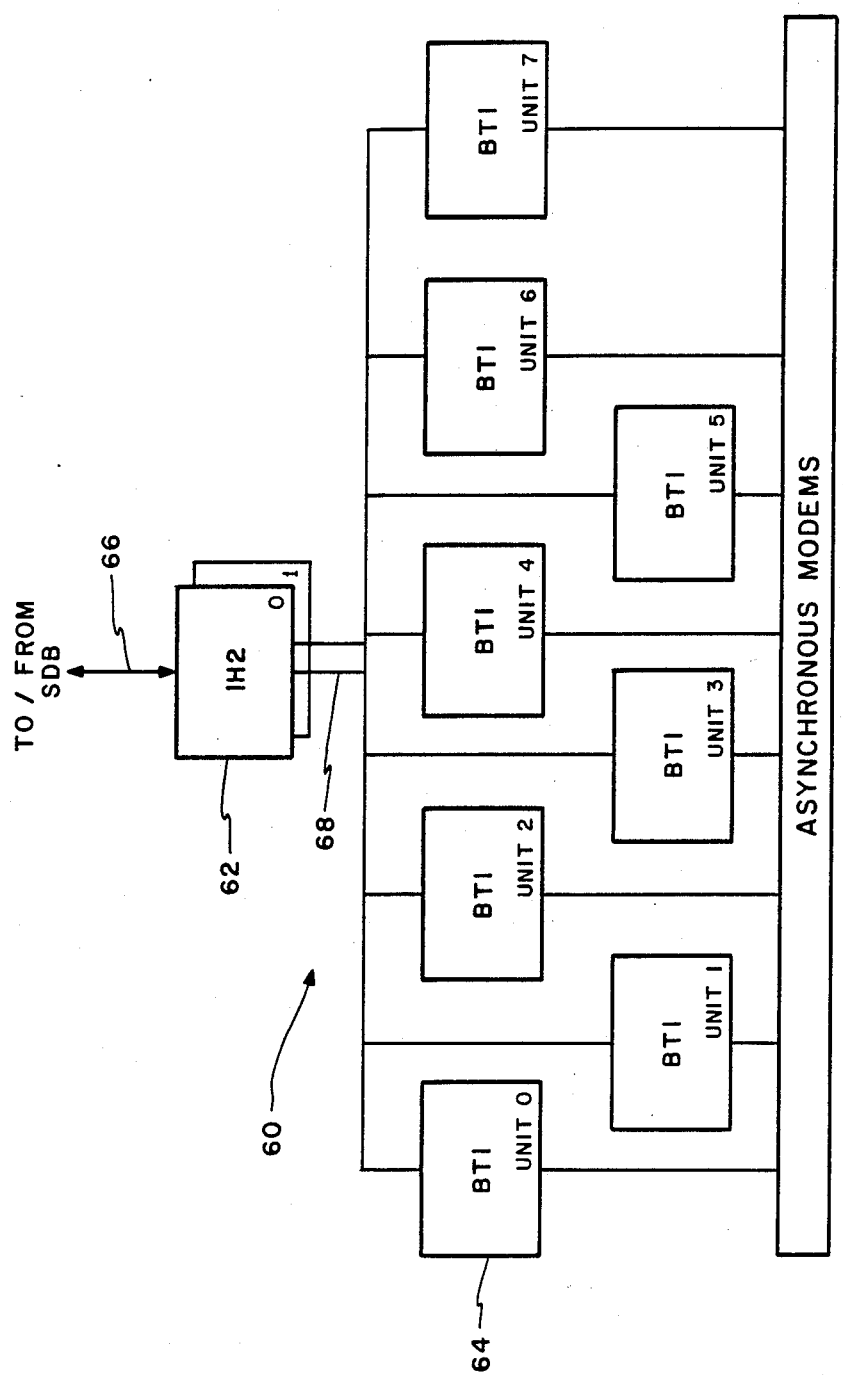
FIGS. 7, 8 and 9 are block diagrams of portions of the FIG. 1 system.

The IB Complex 60 is so called because its hardware architecture is based on IH2 and BTI circuit cards as shown in FIG. 7. It is an intelligent interface which allows the SCX's SDB processor to communicate with several types of I/O devices as well as the ALI data base (ALI-DB).

The I/O device types with which the SCX 12 must communicate all have different characteristics. The intelligence residing in the IB Complex 60 enables it to recognize and communicate properly with each type of device. An example of this decision making process is whether to echo characters back to the inputting device or not. In a terminal communications process, it is desirable to have the input characters echoed, but not in the ALI-DB communications process.

The IH2 card 62 (Model 5984-04) is a Z80A microprocessor based card used to interface a 32-bit, M68020 SBD processor with several 8-bit BTI cards 64. On the SDB side 66 of the interface, the IH2 card 62 provides 247 bytes of shared memory used as a buffer to facilitate SDB-IH2 interprocessor communications. The transfer of data across the interface is under software control. On the BTI side 68 of the interface, eight different enable signals are used to selectively access as many as eight BTI cards 64.

As indicated by the "0" and "1" designations on the IH2 cards 62 in FIG. 7, this card 62 is operated in duplex. That is, two copies are always on-line. One copy will be in-service active, the other in-service standby. In case of a failure on the active copy, the standby copy will automatically assume the active status.

The BTI card 64 (Model 5913-00), also Z80A based, provides control and TTL parallel-to-RS232 serial and RS232 serial-to-TTL parallel conversions for up to four terminals or I/O devices. Each BTI channel is full-duplex and the standard RS232 handshake protocol is used. The IB complex has 32 channel capacity.

Comparing FIGS. 7 and 8, the hardware architecture of the IB Complex 60 and the SMC Complex 70 are structurally similar. Functionally, however, they are quite different. The purpose of the Synchronous Modem Controller (SMC) Complex 70 is to establish half-duplex communications links for sending ANI and ALI data to the IPSAP console. To this end, the SMC complex 70 uses a pool of synchronous modems 72. In the SMC hardware hierarchy, each group of four Synchronous Terminal Interface (STI) cards 74 (also referred to as SMC cards because of the function they serve) communicate with the SDB via a duplex pair of High Level Interface (HLI) cards 76 (Model 5822). The HLI cards 76 contains the logic necessary to address and enable the STI cards 74 below it.

The STI cards 74 (Model 5914-02) are Z80A based cards used where synchronization of the data transmission is required. This card 74 utilizes the Z80 Direct Memory Access (DMA) Controller and the Z80 Serial Input/Output (SIO) Controller. The DMA has the capability of requesting control of the Z80 address and data buses and can transfer data between memory and the SIO. Data transfer by the DMA is transparent to the Z80A and tends to minimize CPU overhead.

The two-channel SIO performs the parallel-to-serial and serial-to-parallel conversions. The channel mode of operation is dictated by software and runs in a half-duplex mode using a modified High Level Data Link Control (HDLC) protocol. The SIO also provides automatic Cyclic Redundancy Checking (CRC). Two plug-in subassemblies, one for each channel, provide TTL-RS232 conversion.

The system is capable of querying the CCI Power 6/32 data base and receiving ALI information. This full duplex communication takes place over an X.25 (CCITT circa 1980, 1984) Permanent Virtual Circuit (PVC) using the Single Link Protocol (SLP). The CCITT Recommendation specifies three functional levels—physical, link, and packet. Collectively, these elements provide link establishment, link maintenance, PVC establishment, error free data transmission, and link control facilities. FIG. 9 is a simplified diagram of the hardware hierarchy used to implement the X.25 interface. As shown, the CCI X.25 interface is made up of hardware types described. As pointed out earlier, the PSCS centralizes PSAP control, call routing and distribution, and ALI retrieval within the SCX Switching system rather than at each answering point. This design eliminates the need to install switching system equipment frames of any kind at the answering point. In a typical PSCS environment, this type of equipment is located at the switching center office. Central office equipment will vary according area requirements. In general, however, central office equipment will consist of an SCX Switching System, sized to meet the trunking and service circuit requirements of the application, plus the interface Frame.

The central office equipment may also include at least one terminal to be used for administrative and maintenance purposes.

While each IPSAP on a customer's premise may be equipped differently, each agent position within an IPSAP must be equipped the same. The different types of equipment available to support operations at the IPSAP location include the console, handset, headset, ANI display unit and ALI display as well as supervisor equipment and printers. The console provides both a voice and data interface to the SCX and may be equipped with either a cradle mounted handset or headset as pictured.

The console communicates with the SCX via a built-in 4800 bps asynchronous modem. ANI and ALI data is stored in the console and also transmitted to an ANI/ALI display via an RS232 interface.

Another type of data communications that takes place between the console and the SCX is the exchange of control information. As indicated earlier, control information is sent between the SCX and console in the form of DTMF tone sequences. When a function key on the console is depressed—a hook flash, a pause, then a 2-digit DTMF tone sequence is sent the SCX. The flash informs the SCX and then connects a register to receive them. The console also employs a DTMF detector to monitor signals from the SCX used to turn console lamps on and off.

Figure 10:
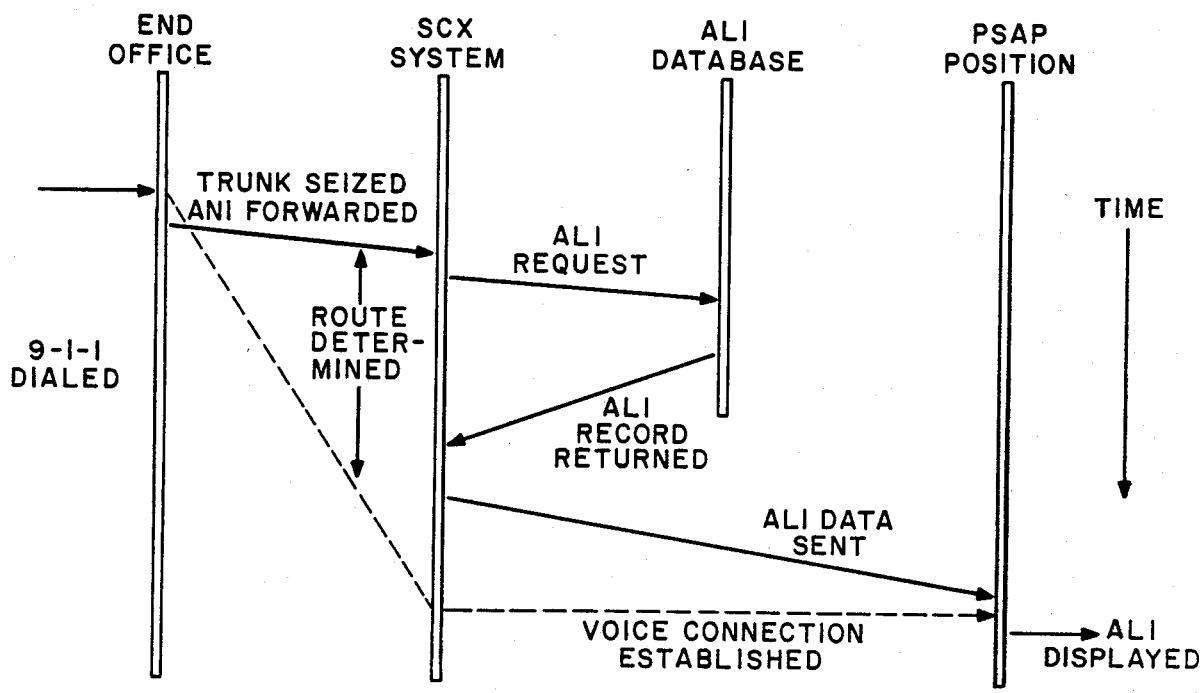
FIG. 10 is a diagram depicting the chronological events that occur when a 911 call is received by the system.

FIG. 10 depicts the chronological events in the system when a 911 call is received. In particular, it is a feature of the present invention that voice communication is established concurrently with ALI data retrieval from the ALI database and transmission to the PSAP position.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A telephone call distribution system for handling a special type call, said call containing at least automatic number identification (ANI) data, comprising:
    at least one central switching location for receiving said call and having means for processing;
    means for interfacing with an automatic location identification (ALI) data base having ALI data associated with said ANI data, said means for interfacing receiving said ANI data from said means for processing and returning said ALI data to said means for processing, and having means for storing said ALI data associated with said call; and
    means for connecting said means for processing to at least one remotely located terminal means for receiving said call, said means for processing also sending said ALI data to said terminal means.

2. The telephone call distribution system of claim 1, wherein said means for connecting is a two-wire pair line.

3. The telephone call distribution system of claim 1, wherein said ALI data is sent to said terminal means before said call is received by said terminal means.

4. The telephone call distribution system of claim 1, wherein said ALI data is retrieved by said means for interfacing while said call is being processed by said central switching location.

5. An integrated public safety answering points system for use with a plurality of user telephones and an auto location identification (ALI) database, comprising:
    an SCX connected via a plurality of end offices to said plurality of user telephones, said SCX having means for interfacing with said ALI database and means for storing selected data from said ALI database;
    at least one terminal having means for interfacing with said SCX, said terminal receiving said selected data from said SCX and having a voice connection via at least said SCX with a predetermined caller from said plurality of user telephones; and
    transmission means for connecting said SCX to said terminal having only a two-wire line connected to said terminal.

6. The integrated public safety answering points system of claim 5, wherein said SCX has means for transmitting said ALI data first to said terminal over said two-wire line and means for establishing voice communication after transmission of said ALI data over said two-wire line between said SCX and said terminal.

7. The integrated public safety answering points system of claim 5, wherein said system has a plurality of terminals connected via said means for connecting to said SCX and said SCX has a means for automatic call distribution for routing said selected data and said predetermined call to an available terminal of said plurality of terminals.

8. The integrated public safety answering points system of claim 5, wherein said system further comprises a plurality of jurisdictions each having at least one terminal connected by said means for connecting to said SCX, said SCX having means for automatic number identification.

* * * * *